US008315902B2

(12) United States Patent
Kennard

(10) Patent No.: US 8,315,902 B2
(45) Date of Patent: *Nov. 20, 2012

(54) SYSTEM AND METHOD FOR REDEMPTION OF AWARDS BY AWARD PROGRAM PARTICIPANTS

(76) Inventor: Wayne Mariner Kennard, Weston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/135,658

(22) Filed: Jul. 12, 2011

(65) Prior Publication Data

US 2011/0295674 A1 Dec. 1, 2011

Related U.S. Application Data

(63) Continuation of application No. 11/385,213, filed on Mar. 21, 2006, now Pat. No. 7,979,306, which is a continuation of application No. 09/721,869, filed on Nov. 24, 2000, now Pat. No. 7,076,446.

(51) Int. Cl.
*G06Q 30/00* (2006.01)

(52) U.S. Cl. ............... 705/14.1; 705/14.14; 705/14.27; 705/14.36

(58) Field of Classification Search ............... 705/14.1, 705/14.14, 14.27, 14.36
See application file for complete search history.

(56) References Cited

U.S. PATENT DOCUMENTS 7,979,306 B2 * 7/2011 Kennard .................. 705/14.1

OTHER PUBLICATIONS

Battaglia, Julie, "Hilton Ushers in New Era of Hotel Frequent Traveler Programs", Business Wire, Nov. 26, 1990.*

* cited by examiner

*Primary Examiner* — Donald L Champagne

(57) ABSTRACT

A system and method for maximizing airline award program participant's use of the accumulated award miles even in light of mileage shortfalls for the redemption of mileage awards is described. The system and method not only a benefit to the award program participant, but also provides financial benefits to the airline offering the award program, and these financial benefits are ones that the airline would not ordinarily obtain.

4 Claims, 2 Drawing Sheets

SYSTEM AND METHOD FOR REDEMPTION OF AWARDS BY AWARD PROGRAM PARTICIPANTS

This is a continuation of U.S. application Ser. No. 11/385,213, filed Mar. 21, 2006, now U.S. Pat. No. 7,979,306, which is a continuation of U.S. application Ser. No. 09/721,869, filed Nov. 24, 2000, now U.S. Pat. No. 7,076,446.

FIELD OF THE INVENTION

The present invention relates to systems and methods for award program participants to redeem mileage awards. More particularly, the present invention related to systems and methods for award program participants to redeem mileage awards when such a participant's accumulated award mile total is less than required number of award miles necessary to redeem a set or posted award.

BACKGROUND OF THE INVENTION

Practically every airline, as a promotional vehicle, has a mileage award program. These programs are designed to provide, particularly frequent business flyers, with an incentive to fly on that particular airline. Over the years, these programs have had their intended affect and many of these frequent flyers not only have developed brand loyalty for a particular airline but will go to great lengths to ensure that they take that particular airline to obtain award miles even when the trip is a non-direct route and direct routes arc were available on other airlines. The main reason for this is to maximize the accumulated award miles in a particular mileage award program.

The travel industry, in general, has seized upon the airline mileage award programs to partner with the airlines to provide incentives for frequent flyers to use their services. For example, many hotels provide frequent flyers with the ability to receive award miles based on the amount spent on a stay at the hotel. Many of these hotels provide the frequent flyer with the ability to select the particular airline award program to which the hotel-generated award miles may be applied. The car rental companies also have provided award miles to airline award programs in the same of similar way as hotels.

Travel agents have promoted the collaborative efforts of travel industry members. These travel agents will attempt to hook trips so that the frequent flyers may maximize the amount of award miles that can he applied to a particular mileage award program.

Frequent flyers use the award miles for many different purposes. Two of the main purposes for redeeming mileage awards from awards programs are for upgrading the class of service that a frequent flyer will have on a particular flight and for vacations. This latter use is the situation in which the frequent flyer wants to accumulate the greatest number of award miles possible so he or she will be able to redeem mileage awards for him- or herself, and also for members of the flyer's family. So, if the frequent flyer is part of typical family of four, there may be the need for frequent flyer to have accumulated from 100,000 to 120,000 award miles to be able to obtain the required number of tickets to go on vacation together without the need to purchase airline tickets or separate the family to fly on more than one airline, as will be discussed.

One of the main problems with the awards programs as they presently exist is that it does not permit the mileage award program participant to fully maximize the number of accumulated award miles. For example, in simple upgrade situations in which the amount of award miles that are needed to upgrade a class of service is from 5000 to 10,000 award miles, there is usually not a problem because a frequent flyer normally will have a greater number of accumulated award miles than this. However, this changes significantly when the frequent flyer is attempting to redeem a number of awards for a family vacation or international travel. Under these circumstances, the frequent flyer may have a large number of accumulated award miles but the frequent flyer may find that he or she does not have quite enough miles to obtain all of the tickets needed (but may be close).

In some cases, when the frequent flyer has accumulated award miles in more than one airline award program, he or she will redeem mileage awards in two programs, and then split the family and part will go on one airline and the remainder will go on another airline, even though, it would have been far more desirable to travel together. In situations, where there is international travel and the frequent flyer's accumulated award miles fall just short of the amount needed to redeem an award, the frequent flyer may just not go or it may have to just pay for the ticket at the best price possible because of the inability to effective use the miles that have been accumulated.

The airlines have made some attempt to permit award program participants to use part of the accumulated award miles by allowing the participant to apply his or her miles to segments of the trip. However, this use is for class of service upgrades. Further, this use, in actuality, does not solve the problem of allowing frequent flyers to maximize the use of their accumulated award miles.

An airline that offers a particular award program is losing significant revenue by requiring that award program participants to have the exact or greater number of accumulated award miles to be able to redeem an award. Moreover, these airlines are failing to increase brand loyalty which would increase if these airlines would allow frequent flyers to redeem mileage awards when they may be a little short of the required award miles.

The present airline award programs do not provide a method by which award program participants can combine their accumulated award miles with an appropriate amount of money to satisfy the amount that the participant is deficient in award miles without purchasing a ticket. For example, if the frequent flyer has accumulated 79,343 award miles and wanted to take his family on a vacation and this frequent flyer is a loyal user of that particular airline. If a round-trip tickets for the frequent flyer's family of four is 20,000, each then the frequent flyer could redeem sufficient miles for three tickets but would not be able to obtain the fourth ticket because he or she would only have 19,343 accumulated award miles to apply to the last ticket. The frequent flyer has two alternatives to deal with this situation. The first, so that the entire family can travel together, is to simply obtain three tickets by redeeming award miles and purchasing the fourth ticket. The second, as is normally the case, one of the parents will travel with one child and the other parent will travel separately with the other child on a different airline. This is done by redeeming mileage awards in the award program of two different airlines if the frequent flyer or their spouse is lucky enough to have sufficient accumulated miles with a different airline, which is not always the case. However, even if the second alternative is available, there usually are significant logistical problems in trying to coordinate the travel plans of the family groups in departing from, and arriving at, a desired location, and returning home.

These and other problems are overcome by the system and method of the present invention.

SUMMARY OF THE INVENTION

The present invention is a system and method for providing a way by which airline award program participants can maximize the use of the accumulated award miles even in light of mileage shortfalls for the redemption of mileage awards. The present invention provides not only a benefit to the award program participant, but also provides financial benefits to the airline offering the award program.

According to the present invention, the airline that is offering the mileage award program will set or post on a periodic basis the amount of the accumulated airline miles needed to redeem particular mileage awards. For example, an airline award program may post that a program participant may redeem a domestic coach airline ticket for 20,000 accumulated award miles, a domestic business class ticket for 30,000 accumulated award miles, or a domestic first class ticket for 40,000 accumulated miles. Preferably, however, such the airline award programs should provide the award program participants with be able to redeem awards if a participant's amount of accumulated award miles is within a predetermined percentage range of the set or posted award amount if the participant will pay an amount of money to compensate for the shortfall in the number of accumulated miles.

As an example of the preferred embodiment of the present invention, an airline award program participant has accumulated 79,567 award miles and there and now desires to obtain four tickets for a family vacation, and each ticket requires the redemption of 20,000 award miles. According to the present invention, the participant will first obtain three tickets for the redemption of 60,000 award miles. This will mean that there will be 19,567 award miles that remain on account for the participant to apply to the fourth award ticket.

The next the system and method of the present invention will determine if the number of award miles that remain available to apply to the redemption of the fourth award falls within the percentage range for which the airline program will permit the participant to pay an amount to compensate for the mileage shortfall. This will allow a participant to maximize the use of the award miles available. However, if the number miles that the participant has available does not fall within the percentage range, then the participant will not be eligible to purchase the miles to compensate for the award mileage shortfall.

If the award program participant has a sufficient number of award miles to fit within the allowable percentage range, then the system and method will determine the number of miles that will have to be added to the number of accumulated award miles to overcome the shortfall. Once this determination is made, the airline will multiply the number of miles that are needed to compensate for the mileage shortfall times a dollar amount based on this number of miles that must be compensated for. The amount that is determined from this calculation is what the participant must pay to obtain the ticket with the redemption of the shortfall of award miles. As such, the award program participant will receive three tickets from the redemption of the 60,000 award miles and a fourth ticket for the redemption of the 19,567 award miles along with the payment of the amount to compensate for the 433 mile shortfall.

An object of the present invention is to provide a system and method that will allow an award program participant to be able to maximize the use of accumulated award miles even in light of a shortfall in the number of miles required to redeem an award.

Another object of the present invention is to provide a system and method that will allow an airline offering an award program to realize payments for shortfalls in the number of miles required to redeem an award, which are payments that such airlines ordinarily would not receive.

These and other objects of the present invention will be described in detail in the remainder of the specification referring to the drawings.

DETAILED DESCRIPTION OF THE DRAWINGS

The present invention is a system and method for providing a way by which an airline award program participant can maximize the use of accumulated award miles even in light of a mileage shortfall for the redemption of mileage awards; and the system and method of the present invention also financially benefit the airline offering the award program. In the preferred embodiment, the system of the present invention is a compute-based system that will permit the on-line determination of the amount that will have to be paid by the award program participant in order to redeem an award in light of the shortfall in accumulated award miles.

Figure 1:
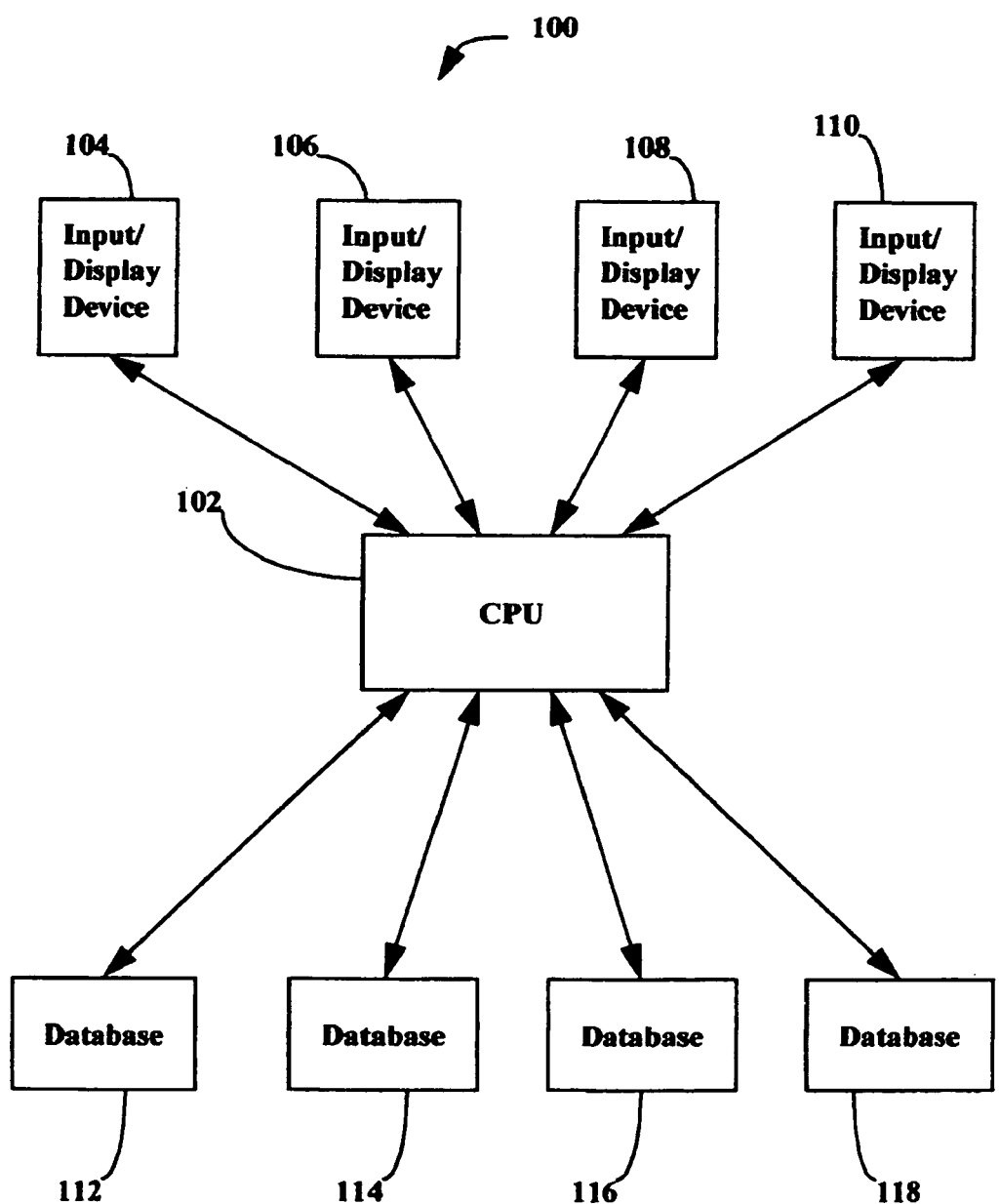
FIG. 1 shows a representative block diagram of the system of the present invention.

FIG. 1, generally at 100, shows a referred embodiment of the system of the present invention. According, to FIG. 1, the system of the present invention may be distributed system in which there may central processing unit ("CPU") 102 that connects to one database or a plurality of databases. As an example, FIG. 1 shows four databases that are shown at 104, 106, 108, and 110. The system may have one input/display device or a plurality of input/display devices. Again, as an example, FIG. 1 shows four input/display devices that are shown at 112, 114, 116, and 118.

The input/display devices may be connected by to the CPU various methods. These, include, but are not limited to, hard-wiring the input/display devices to the CPU and wireless methods that include and air interface. It is also to be understood that the system may include more than one processing unit and each of the processing units may have different or redundant responsibilities in system.

An input/display device, for example, input/display device 112, may permit the operator of the device to input to general system information about the potential flyer's reservation including his or her frequent flyer number. This potential flyer may purchase a ticket at the time the reservation is made or at a later time based on the reservation up until the time the flight departs. If the potential flyer does not have a frequent flyer number, the process for obtaining one may be initiated when the reservation is made or at a later time.

When the frequent flyer checks in and takes the flight, or if the flyer did not have prior reservations but purchases a ticket at the time and date of the flight and takes the flight, and this flyer has a frequent flyer number, the system will add the amount of frequent flyer miles that is attributed to the flight to the frequent flyer's accumulated miles. This amount of accumulated miles may be stored in one of the databases, for example, database 108.

For each frequent flyer, a database, such a database 108, may store the accumulated award mileage for a particular frequent flyer in a method by which it will be associated with the that frequent flyer's frequent flyer number. New accumulated award miles are stored in such a way that they may be retrieved on-line so that the amount accumulated award may be checked when desired. However, the system may be configured so that there are controls on the ability to retrieve the accumulated award miles for a particular award program participant, such as only by airline personnel and through the use a special password by the frequent flyer of his or her own accumulated miles total.

It is understood the system of the present invention may have a different configuration that the preferred embodiment shown in FIG. 1 and still within the scope of the present invention.

Having now described the preferred embodiment of the system of the present invention, the preferred method of the present invention will be described.

Figure 2:
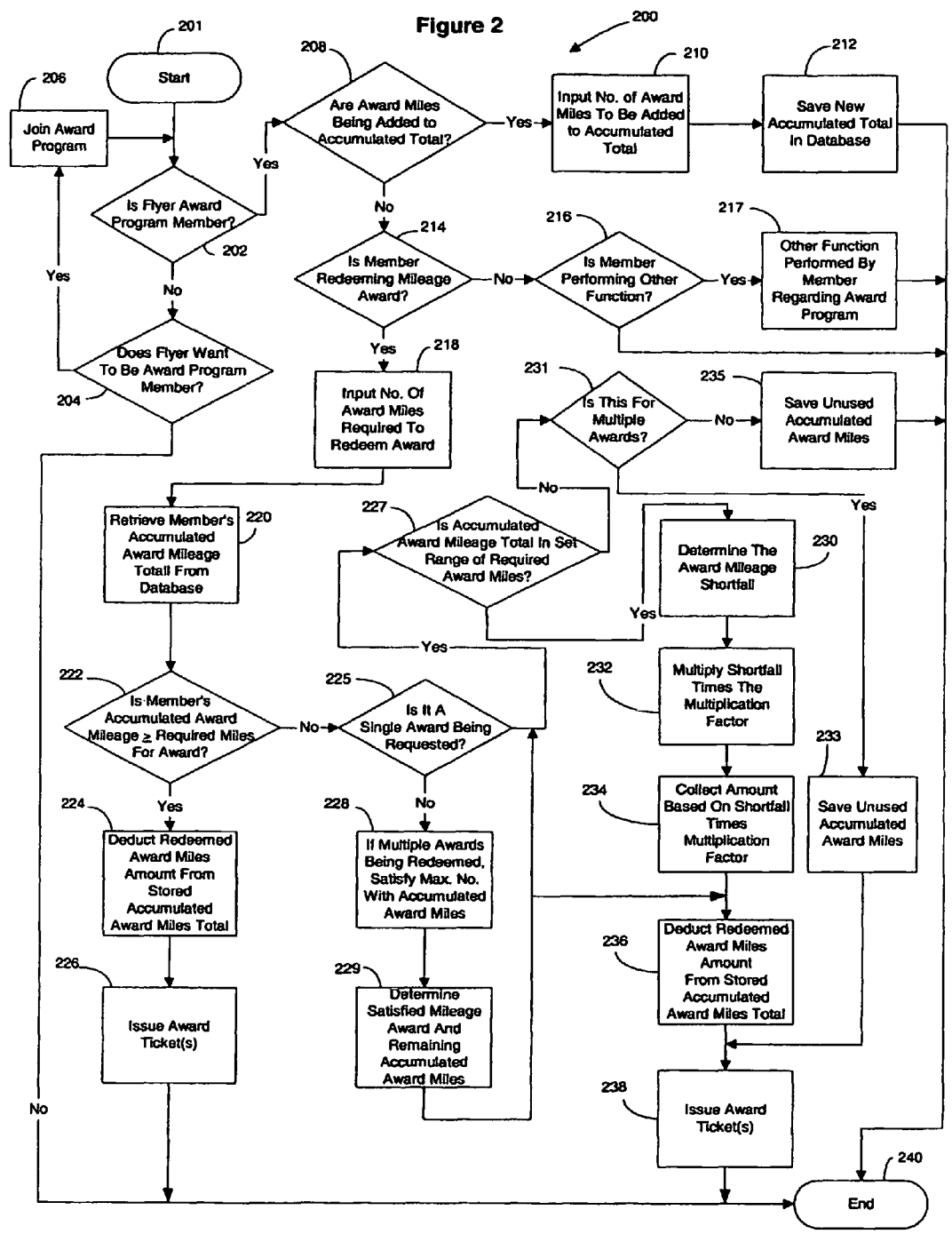
FIG. 2 shows a representative flow diagram of the method of the present invention.

FIG. 2 shows a flow diagram of the method of the present invention generally at 200. Although FIG. 2 shows the preferred method of the present invention, it is understood that the method of the present invention may be practiced by variations of the preferred embodiment and still be within the scope of the present invention.

The method of the present invention that is shown generally at 200 will be started at Start 201. The method of the present invention will be started by the airline company or the entity that is offering award program because it is this entity that will maintain the database of the accumulated award miles, permit flyers to join the award program, and permit the redemption of mileage awards. As an example, the airline may start the method of the present invention when a flyer purchases a ticket and takes a flight if the airline has been provided the flyer's frequent flyer number. At the time the ticket is purchased, the airline employee will ask the flyer at 202 if the flyer is a participant in that airline's mileage award program. If the flyer is not a participant in the award program, the airline employee will ask the flyer if he or she would like to join the program at 204. If the flyer would like to join, he or she will be permitted to do so at 206 and the flyer is given a frequent flyer number and an mileage account is set up in the appropriate database. After this, the method returns to 202.

The new award program participant, who now has a frequent flyer number, at 202 will now go to 208. Since the new participant will likely not have enough accumulated miles to qualify for an award, the participant will not be seeking to redeem a mileage award. Under these circumstances, the method will be directed go to 210 where the number of award miles for the flight being taken is added to the database account for the flyer's frequent flyer number. If this is in fact a new program participant, this will be the first award miles for the flyer that is saved in database at 212. Following this, the method will proceed to End 240.

If at 202, the flyer is already an award program participant, the method will proceed directly to 208. At 208 as stated, there is a determination whether the participant is seeking to add additional award miles to their award miles account. If yes, the method proceeds to 210 where the number of new miles is input to the system and, at 212, the new award miles are added to the participant's accumulated award miles and this is new total is saved in the database that contains the participant's account. After the database is updated, the method proceeds to End 240.

In those cases, at 208, when the flyer is seeking to do more with respect to his or her frequent flyer account than just add new award miles to their accumulated total of award miles, the method will proceed to 214. At 214, there is a determination whether the award program participant is seeking to redeem a mileage award or is there some other actions that the participant desires to take with respect to his or her mileage award account. If the participant desires to do something other than redeem a mileage award, the method proceeds to 216. At 216, if it is determined that there is another action that is desired on the part of the participant, the method will transfer the matter to 217, where the method links to another method to handle this matter or to an airline employee who will work with the participant to solve the participant's concerns. Further, if at 216, it is determined that the matter is inappropriate for handling by this method, the method will proceed to End 240.

According to the method of the present invention, if it is determined at 214 that the award program participant is seeking to redeem a mileage award, the method will proceed to 218. At 218, there is input to the method of the amount of miles needed to receive the desired mileage award. This information, based on the appropriate query using the method, may be input by an airline employee or, it there is an on-line system, it may be input by the participant. This input of the required award miles to redeem a particular award may be a manual input of the mileage amount or it may be retrieved from a data-base.

Once the amount required award miles is determined, the method of the present invention will next go to 220. At 220, the method will retrieve from the appropriate database the accumulated award miles for the particular award program participant. The accumulated award miles that are retrieved will be the updated total amount of award miles.

At 222, the method will compare the amount of the award miles required for a particular award with the total number of accumulated award miles for the participant who desires to redeem a mileage award. At 222, in making the comparison, the method will determine if the participant is requesting a single or multiple mileage awards. If the award program participant is requesting a single award redemption, the comparison at 222 will determine if the accumulated award miles are equal to, or greater than, the number of required miles. The method will proceed to 224 if the comparison indicates that there is an adequate number accumulated that will permit the award program participant to receive the requested award.

At 224, the method of the present invention will deduct the redeemed award miles from the accumulated total of award miles for the award program participant. Once this deduction is made, the new accumulated total for the participant who has just redeemed award miles will be saved in the database that retains the accumulated award miles for that particular award program participant.

Following the deduction of the redeemed award miles from the accumulated total award miles, the airline or the entity administering the mileage award program will issue the mileage award ticket to the award program participant at 226. After the issuance of the mileage award ticket, the method of the present invention will proceed to End 240.

At 222, as stated, the method will determine if the award program participant is redeeming multiple awards or just one award. In the multiple awards situation, the method will determine the number of awards seeking to be redeemed and, from 218, the required award miles for each requested award redemption. Then at 222, the comparison will determine the number of requested awards the may be satisfied by the award program participants accumulated award miles. For example, if the award program participant has 100,000 accumulated award miles and this participant is seeking to redeem award miles for three tickets, the method will calculate the total number of award miles needed for three tickets and compare this total will the number of accumulated miles of the participant. If the requested redemptions are for 20,000, 30,000, and 40,000 award miles, the method at 218 will sum the total for the three requested award redemptions to be 90,000 award miles. Under these circumstances, the comparison at 222 will show that there are sufficient award miles for the three awards. The method will then proceed to 224 and deduct the 90,000 redeemed award miles from the participant's accumulated total of award miles. This is followed by the issuance of the three awards at 226. The database that stores the award program participant's account will have been updated to indicate that the accumulated award miles to be 10,000 award miles. After this, the method will proceed to End 240.

In the single or multiple award situations, the comparison at 222 may indicate that the number of accumulated award miles is less than the number of required award miles for the requested award redemption. In such situations, the method of the present invention will proceed to 225 where it is determined if the requested award redemption is a single or multiple award redemption. If it is a single award redemption, the method will proceed to 227, and if there are multiple award redemptions to 228.

At 227, the method of the present invention will determine whether the accumulated award miles total falls within a predetermined percentage range of the required award mileage. This percentage may be selected by the airline or entity administering the mileage award program. For example, such an entity may select the percentage range to be from 95% to 100%-1 of the required award mileage. Alternatively, the method may not state this requirement as a percentage range but as the need for the accumulated award miles to be greater than, or equal to, 95% of the required number award miles. If at 227, it is determined that the accumulated award miles is not within the selected percentage range, or is not equal to, or greater than, the selected percentage, the method of the present invention will proceed to 231.

At 231, it is determined if this is a single or multiple award redemption. If it is a single award redemption, the method will proceed to 235. At 235, the method will save the unused accumulated award miles in the appropriate database. Following the saving of these award miles, the method will proceed to End 240. However, if the accumulated award miles is within the selected percentage range, or is equal to, or greater than, the selected percentage, the method will instead go to 230.

At 230, the method of the present invention will determine the number of award miles that constitute the mileage shortfall. This is may be done, for example, by subtracting the accumulated award miles from the required award miles. This number of shortfall miles is multiplied by a multiplication factor at 232. This multiplication factor may be fixed for each of the shortfall miles. For example, if the award mile shortfall is 160 miles, the multiplication factor may be $0.50/mile, so the amount to purchase the shortfall miles would be $80.00.

The method may also use a weighting system to determine the amount that will have to be paid to compensate for the mileage shortfall. For example, if the percentage range or the amount in excess of a predetermined percentage equals 500 miles, the weighting system multiplication factors could be $0.50 for 449-500 shortfall miles; $0.47 for 401-450 shortfall miles; $0.44 for 349-400 shortfall miles; $0.41 for 350-399 shortfall miles; $0.38 for 300-349 shortfall miles; $0.35 for 250-299 shortfall miles; $0.32 for 200-249 shortfall miles; $0.29 for 150-199 shortfall miles; $0.26 for 100-149 shortfall miles; $0.23 for 50-99 shortfall miles; and $0.20 for 1-49 shortfall miles. Moreover, the method may have an oppositely weighted system in which the weighting is highest for the smallest mileage category and lowest for the largest mileage shortfall. Accordingly, the airline or entity that is administering the method will select the weighting system it desires to use, and at 232, the weighting system is applied as the multiplication factor to the award mileage shortfall to determine the amount that the award program participant must pay with the surrender of the accumulated award miles to redeem the desired award.

Once the determination of the amount to be paid for the shortfall is determined, at 234, this amount is collected by the airline or the entity that is administering the mileage award program. After the amount for the shortfall is paid, the accumulated award miles is deducted from the total that is stored in the database at 236. Since this is a situation in which there was less than number of award miles that were required to redeem the award, which was compensated for by paying for the shortfall, the balance in that award program participant's account should be zero.

After the deduction of the award miles, the method invention of the present proceeds to 238 where the redeemed award is issued to the award program participant. Following this, the method will move to End 240.

When there is a multiple redemption situation, at 225, the method of the present invention moves to 228. At 228, the method will determine which of the multiple award redemption requests may be satisfied by the total number of accumulated award miles of the award program participant. For example, the award program participant may desire to redeem four awards which consist of two 20,000 mileage awards, one 30,000 mileage award, and one 40,000 mileage award and this participant may have an accumulated award total of 110, 567. The method of the present invention, unless instructed otherwise, will automatically satisfy the maximum number of award redemptions first given the number of accumulated award miles. The method may be programmed to start with the largest redemption award request and move to the smallest, or from the smallest award redemption request and move to the largest. Further, the award program participant may indicate the order in which the redemption award requests are to be filled.

In the example, just set forth, if the method is programmed to proceed from smallest to largest, at 228, the method will determine that there were enough accumulated award miles to redeem the two 20,000 mileage awards and the 30,000 mileage award, which totals 70,000 award miles, but not enough to redeem the 40,000 mileage award. The method, after redeeming the maximum number of mileage awards possible will proceed to 229.

At 229, the method will determine the number of remaining accumulated award miles after satisfying the maximum number of mileage awards at 228. If there are remaining miles, and there should be, these award miles will be transmitted to 227.

With regard to the redemption awards that were satisfied at 229, the method proceeds to 236. At 236, the 70,000 redeemed award miles will be deducted from the award program participant's stored accumulated award mile total in the database. Following this, the award tickets are issued at 238, but not sent to the participant. The award tickets are not set to the participant yet because there must be a determination whether the remaining accumulated award miles qualify for the purchase of the award mileage shortfall for redeem the fourth requested mileage award.

As stated, at 229, the method determines the remaining number of accumulated award miles after processing the award redemptions that are fully satisfied by the participant's current total number of accumulated award miles. This number of accumulated award miles that remain are sent to 227, as discussed. At 227, the method will determine if the accumulated award miles total falls within a predetermined percentage range of the required award mileage, or greater than, or equal to, a selected percentage of the required award mileage. This percentage may be selected by the airline or entity administering the mileage award program. For example, such an entity may select the percentage range to be from 95% to 100%-1. Alternatively, the method may select a percentage that is greater than, or equal to, for example, 95%. If at 228, the accumulated award miles is not within the selected percentage range, or is not equal to, or greater than, the selected percentage, the method of the present invention will proceed to 231. At 231, the method will determine if this a multiple award redemption. If it is, the method will proceed to 233 where the unused accumulated award miles total will be saved in the appropriated data-base. The method will then go to 238 where the three award tickets that were issued but not sent are being held. The saving of the unused award miles will permit the release of the three tickets which are now sent to the award program participant. Following the sending of the mileage award tickets, the method will proceed to End 240.

On the other hand, if the accumulated award miles is within the selected percentage range, or is equal to, or greater than, the selected percentage, the method will instead to 230. At 230, the method of the present invention will determine the number of award miles that constitute the mileage shortfall. This is may be done, for example, by subtracting the accumulated award miles from the required award miles. This number of shortfall miles is multiplied by the multiplication factor at 232. This multiplication factor may be fixed for each of the shortfall miles. For example, if the award mile shortfall is 160 miles, the multiplication factor may be $0.50/mile, so the amount to purchase the shortfall miles would be $80.00.

The method may also use a weighting system with regard to the amount that have to be paid for the shortfall miles. For example, as stated, if the percentage range or the amount in excess of a predetermined percentage equals 500 miles, the weighting system multiplication factors could be $0.50 for 449-500 shortfall miles; $0.47 for 401-450 shortfall miles; $0.44 for 349-400 shortfall miles; $0.41 for 350-399 shortfall miles; $0.38 for 300-349 shortfall miles; $0.35 for 250-299 shortfall miles; $0.32 for 200-249 shortfall miles; $0.29 for 150-199 shortfall miles; $0.26 for 100-149 shortfall miles; $0.23 for 50-99 shortfall miles; and $0.20 for 1-49 shortfall miles. The method may also have an oppositely weighted system in which the weight is highest for the smallest mileage category and lowest for the largest mileage shortfall. Accordingly, the airline or entity that is administering the method will select the weighting system it desires to use, and at 232, the multiplication factor is applied to the award mileage shortfall to determine the amount that the award program participant must pay with the surrender of the accumulated award miles to redeem the desired award.

Once the determination of the amount to be paid for the shortfall is determined, at 234, this amount is collected by the airline or the entity that is administering the mileage award program. After the amount for the shortfall is paid, the accumulated award miles is deducted from the total that is stored in the database at 236. Since this is a situation in which there was less than number of award miles that were required to redeem the award, which was compensated for by paying for the shortfall, the balance in that award program participant's account should be at zero. Then at 238, the method proceeds to End 240.

At this point, the fourth award redemption ticket is sent to the award program participant along with the other three award redemption tickets.

The terms and expressions that are employed herein are terms or description and not of limitation. There is no intention in the use of such terms and expressions of excluding the equivalents of the feature shown or described, or portions thereof, it being recognized that various modifications are possible within the scope of the invention as claimed.

The invention claimed is:

1. A computer-based system for maximizing redemption award units in an award program, the system comprising:
   (a) an input/display device for inputting into the system a number of award units accumulated for at least one award program participant earned by performing acts under the award program for which predetermined numbers of award units will be awarded;
   (b) a storage device for storing
      (1) at least one predetermined award unit level for which the award program will issue an award program participant an award,
      (2) a shortfall percentage, and
      (3) the number of accumulated award units for at least one award program participant input using the input/display device;
   (c) a processing device for providing at least one award program participant a means to redeem an award program award by
      (1) retrieving from the storage device a predetermined award unit level for which an award program participant may redeem accumulated award units to receive a particular award;
      (2) retrieving from the storage device the accumulated award unit total for an award program participant requesting to redeem an award;
      (3) comparing the retrieved predetermined award unit level with the retrieved accumulated award unit total for an award program participant requesting to redeem the award, and determining if the retrieved accumulated award unit total is less than the retrieved predetermined award unit level, and if the retrieved accumulated award unit total is less than the retrieved predetermined award unit level go to substep (c)(4);
      (4) determining if the retrieved accumulated award unit total is equal to, or greater than the shortfall percentage stored in the storage device multiplied by the retrieved predetermined award unit level, and if the retrieved accumulated award unit total is equal to, or greater than, the product of shortfall percentage multiplied by the predetermined award unit total go to substep (c)(5);
      (5) determining a number of award units that the retrieved accumulated award unit total is less than the predetermined award unit level;
      (6) multiplying the number of award units that the retrieved accumulated award unit total is less than the predetermined award unit level by a multiplication factor that is less than a full value of the cost per flying mile and determining a monetary amount; and
      (7) redeeming an award based on a redemption of the retrieved accumulated award unit total with the monetary amount determined at substep (c)(6).

2. The computer-based system as recited in claim 1, wherein the multiplication factor is the same for each retrieved accumulated award unit total that is less than the predetermined award unit level.

3. The computer-based system as recited in claim 1, wherein the multiplication factor is different for at least two of the retrieved accumulated award unit total that are less than the predetermined award unit level.

4. The computer-based system as recited in claim 1, wherein the multiplication factor is weighted based on the number of award units that the retrieved accumulated award unit total is less than the predetermined award level.

* * * * *